United States Patent
Zhang et al.

(10) Patent No.: US 8,988,191 B2
(45) Date of Patent: Mar. 24, 2015

(54) SYSTEMS AND METHODS FOR PRESSURE-BASED AUTHENTICATION OF AN INPUT ON A TOUCH SCREEN

(75) Inventors: Keshu Zhang, Phoenix, AZ (US); Ken Douros, South Barrington, IL (US); Haifeng Li, Phoenix, AZ (US); Hao Li, Chandler, AZ (US); Yi Wei, Chandler, AZ (US)

(73) Assignee: Symbol Technologies, Inc., Holtsville, NY (US)

( * ) Notice: Subject to any disclaimer, the term of this patent is extended or adjusted under 35 U.S.C. 154(b) by 1228 days.

(21) Appl. No.: 12/548,983

(22) Filed: Aug. 27, 2009

(65) Prior Publication Data

US 2011/0050394 A1    Mar. 3, 2011

(51) Int. Cl.
| | |
|---|---|
| *G05B 19/00* | (2006.01) |
| *G06F 7/04* | (2006.01) |
| *H04B 1/00* | (2006.01) |
| *H04Q 1/00* | (2006.01) |
| *G06F 3/045* | (2006.01) |
| *G06F 21/32* | (2013.01) |

(52) U.S. Cl.
CPC ............... *G06F 3/045* (2013.01); *G06F 21/32* (2013.01)
USPC .......................... 340/5.82; 340/5.53; 340/5.83

(58) Field of Classification Search
CPC ............ G06F 3/041; G06K 5/00; G06K 9/00; G06T 1/00
USPC ............... 340/5.82, 5.53, 5.83; 382/119, 232, 382/115; 713/186; 380/23; 345/173, 169; 235/380, 379, 383
See application file for complete search history.

(56) References Cited

U.S. PATENT DOCUMENTS

| | | | |
|---|---|---|---|
| 4,252,391 A | 2/1981 | Sado | |
| 4,315,238 A | 2/1982 | Eventoff | |
| 4,570,149 A | 2/1986 | Thornburg et al. | |
| 4,625,075 A | 11/1986 | Jaeger | |
| 4,739,299 A | 4/1988 | Eventoff et al. | |
| 4,745,240 A | 5/1988 | Furukawa et al. | |
| 4,800,260 A * | 1/1989 | Simpson-Davis et al. | .... 235/487 |
| 5,008,497 A | 4/1991 | Asher | |
| 5,060,527 A | 10/1991 | Burgess | |
| 5,241,308 A | 8/1993 | Young | |

(Continued)

FOREIGN PATENT DOCUMENTS

| | | |
|---|---|---|
| CA | 2316067 A1 | 2/2002 |
| CN | 101201277 A | 6/2008 |

(Continued)

OTHER PUBLICATIONS

U.S. Appl. No. 12/549,008, filed Aug. 27, 2009 entitled "Method and Apparatus for Pressure-based Manipulation of Content on a Touch Screen".

(Continued)

*Primary Examiner* — Nam V Nguyen (57) ABSTRACT

Systems and methods are provided for authenticating an input on a touch screen. A method comprises obtaining one or more pressure metrics for an input by a user on a touch screen that is being proffered as that of a known user. Each pressure metric corresponds to a pressure applied to the touch screen by the user at a respective impression location of the input. The method further comprises authenticating the user as the known user based at least in part on the one or more pressure metrics.

11 Claims, 5 Drawing Sheets

(56) References Cited

U.S. PATENT DOCUMENTS

| | | | |
|---|---|---|---|
| 5,510,813 A | 4/1996 | Makinwa et al. | |
| 5,647,017 A * | 7/1997 | Smithies et al. | 382/119 |
| 5,673,041 A | 9/1997 | Chatigny et al. | |
| 5,989,700 A | 11/1999 | Krivopal | |
| 6,034,335 A | 3/2000 | Aufderheide et al. | |
| 6,073,497 A | 6/2000 | Tongbi et al. | |
| 6,193,152 B1 * | 2/2001 | Fernando et al. | 235/380 |
| 6,239,790 B1 | 5/2001 | Martinelli et al. | |
| 6,291,568 B1 | 9/2001 | Lussey | |
| 6,307,955 B1 | 10/2001 | Zank et al. | |
| 6,310,614 B1 | 10/2001 | Maeda et al. | |
| 6,473,072 B1 | 10/2002 | Comiskey et al. | |
| 6,492,979 B1 | 12/2002 | Kent et al. | |
| 6,543,299 B2 | 4/2003 | Taylor | |
| 6,558,577 B1 | 5/2003 | Koichi et al. | |
| 6,628,269 B2 | 9/2003 | Shimizu | |
| 6,781,576 B2 | 8/2004 | Tamura | |
| 6,873,715 B2 * | 3/2005 | Kuo et al. | 382/119 |
| 7,081,888 B2 | 7/2006 | Cok et al. | |
| 7,084,859 B1 * | 8/2006 | Pryor | 345/173 |
| 7,093,197 B2 * | 8/2006 | Yoshii et al. | 715/210 |
| 7,146,577 B2 * | 12/2006 | Hoffman | 715/865 |
| 7,152,482 B2 | 12/2006 | Ueno et al. | |
| 7,154,481 B2 | 12/2006 | Cross et al. | |
| 7,196,694 B2 | 3/2007 | Roberts | |
| 7,331,245 B2 | 2/2008 | Nishimura et al. | |
| 7,339,580 B2 | 3/2008 | Westerman et al. | |
| 7,355,594 B2 | 4/2008 | Barkan | |
| 7,355,595 B2 | 4/2008 | Bathiche et al. | |
| 7,415,141 B2 * | 8/2008 | Okazaki | 382/119 |
| 7,499,040 B2 | 3/2009 | Zadesky et al. | |
| 7,509,881 B2 * | 3/2009 | Divigalpitiya et al. | 73/862.041 |
| 7,511,702 B2 | 3/2009 | Hotelling | |
| 7,538,760 B2 | 5/2009 | Hotelling | |
| 7,627,143 B1 * | 12/2009 | Abebe | 382/115 |
| 7,695,647 B2 | 4/2010 | Smela et al. | |
| 7,792,336 B2 * | 9/2010 | Crockett et al. | 382/119 |
| 8,149,211 B2 | 4/2012 | Hayakawa et al. | |
| 8,325,143 B2 | 12/2012 | Destura et al. | |
| 8,390,583 B2 * | 3/2013 | Forutanpour et al. | 345/173 |
| 8,508,487 B2 | 8/2013 | Schwesig et al. | |
| 2002/0180763 A1 | 12/2002 | Kung | |
| 2003/0132294 A1 | 7/2003 | Gomez et al. | |
| 2003/0205450 A1 | 11/2003 | Divigalpitiya et al. | |
| 2004/0028993 A1 | 2/2004 | Jousse et al. | |
| 2004/0212599 A1 | 10/2004 | Cok et al. | |
| 2005/0081640 A1 | 4/2005 | Knowles et al. | |
| 2005/0084138 A1 | 4/2005 | Inkster et al. | |
| 2005/0287048 A1 | 12/2005 | Parkinson | |
| 2006/0066584 A1 | 3/2006 | Barkan | |
| 2006/0137462 A1 | 6/2006 | Divigalpitiya et al. | |
| 2006/0146036 A1 | 7/2006 | Prados et al. | |
| 2006/0262099 A1 | 11/2006 | Destura et al. | |
| 2006/0279548 A1 | 12/2006 | Geaghan | |
| 2007/0045593 A1 | 3/2007 | Yasuda et al. | |
| 2007/0175987 A1 | 8/2007 | Havens et al. | |
| 2007/0198926 A1 | 8/2007 | Joguet et al. | |
| 2007/0202765 A1 | 8/2007 | Krans et al. | |
| 2007/0222764 A1 | 9/2007 | Wang | |
| 2007/0229464 A1 | 10/2007 | Hotelling et al. | |
| 2007/0236466 A1 | 10/2007 | Hotelling | |
| 2007/0268275 A1 | 11/2007 | Westerman et al. | |
| 2008/0024454 A1 | 1/2008 | Everest | |
| 2008/0029691 A1 | 2/2008 | Han | |
| 2008/0048989 A1 | 2/2008 | Yoon et al. | |
| 2008/0058022 A1 | 3/2008 | Ahn | |
| 2008/0091121 A1 | 4/2008 | Sun et al. | |
| 2008/0093687 A1 | 4/2008 | Antaki | |
| 2008/0165141 A1 | 7/2008 | Christie | |
| 2008/0180399 A1 | 7/2008 | Cheng | |
| 2008/0204426 A1 | 8/2008 | Hotelling et al. | |
| 2008/0211784 A1 | 9/2008 | Hotelling et al. | |
| 2008/0211785 A1 | 9/2008 | Hotelling et al. | |
| 2008/0231604 A1 | 9/2008 | Peterson | |
| 2008/0292887 A1 | 11/2008 | Kim et al. | |
| 2008/0303797 A1 | 12/2008 | Grothe | |
| 2008/0309639 A1 | 12/2008 | Wei et al. | |
| 2009/0027353 A1 * | 1/2009 | Im et al. | 345/173 |
| 2009/0120696 A1 | 5/2009 | Tomonori et al. | |
| 2009/0189877 A1 | 7/2009 | Hiroyuki et al. | |
| 2009/0237374 A1 | 9/2009 | Li et al. | |
| 2009/0278815 A1 | 11/2009 | Li et al. | |
| 2009/0295748 A1 | 12/2009 | Liu et al. | |
| 2010/0037709 A1 | 2/2010 | Yeh et al. | |
| 2010/0045610 A1 | 2/2010 | Hong et al. | |
| 2010/0060602 A1 | 3/2010 | Agari et al. | |
| 2010/0066686 A1 | 3/2010 | Joguet et al. | |
| 2010/0117974 A1 | 5/2010 | Joguet et al. | |
| 2010/0141085 A1 | 6/2010 | Wu et al. | |
| 2010/0225443 A1 * | 9/2010 | Bayram et al. | 340/5.83 |
| 2010/0289507 A1 | 11/2010 | Joguet et al. | |
| 2010/0289508 A1 | 11/2010 | Joguet et al. | |
| 2010/0302196 A1 | 12/2010 | Han et al. | |
| 2010/0302197 A1 | 12/2010 | Joguet et al. | |
| 2011/0001487 A1 | 1/2011 | Joguet et al. | |
| 2011/0025615 A1 | 2/2011 | Yang et al. | |
| 2011/0025619 A1 | 2/2011 | Joguet et al. | |
| 2011/0050588 A1 | 3/2011 | Li et al. | |
| 2011/0115736 A1 | 5/2011 | Joguet et al. | |
| 2011/0119580 A1 | 5/2011 | Joguet et al. | |
| 2011/0134067 A1 | 6/2011 | Joguet et al. | |
| 2011/0141026 A1 | 6/2011 | Joquet et al. | |
| 2011/0168957 A1 | 7/2011 | Lonjon et al. | |
| 2011/0169760 A1 | 7/2011 | Largillier | |
| 2011/0181546 A1 | 7/2011 | Joguet et al. | |
| 2011/0181547 A1 | 7/2011 | Joguet et al. | |
| 2011/0227836 A1 | 9/2011 | Li et al. | |
| 2011/0237326 A1 * | 9/2011 | Murakami | 463/29 |
| 2011/0273394 A1 | 11/2011 | Young et al. | |
| 2012/0026124 A1 | 2/2012 | Li et al. | |
| 2013/0063364 A1 | 3/2013 | Moore | |
| 2013/0141338 A1 | 6/2013 | Wei et al. | |
| 2014/0035830 A1 | 2/2014 | Wei et al. | |

FOREIGN PATENT DOCUMENTS

| | | |
|---|---|---|
| EP | 1471415 A2 | 10/2004 |
| EP | 2000896 A2 | 12/2008 |
| FR | 2914756 A1 | 10/2008 |
| FR | 2925717 A1 | 6/2009 |
| JP | 5143219 A | 6/1993 |
| JP | H06274265 A | 9/1994 |
| JP | 2002297305 A | 10/2002 |
| JP | 2005517935 A | 6/2005 |
| JP | 2005528740 A | 9/2005 |
| JP | 2005350614 A | 12/2005 |
| JP | 2008305174 A | 12/2008 |
| JP | 2011003104 A | 1/2011 |
| WO | 9850876 | 11/1998 |
| WO | 241129 A2 | 5/2002 |
| WO | 3021568 A1 | 3/2003 |
| WO | 3094186 A1 | 11/2003 |
| WO | 2004066136 A2 | 8/2004 |
| WO | 2006013485 A2 | 2/2006 |
| WO | 2006017695 A2 | 2/2006 |
| WO | 2007012899 A1 | 2/2007 |
| WO | 2009035184 A1 | 3/2009 |
| WO | 2009104840 A2 | 8/2009 |
| WO | 2010117882 A2 | 10/2010 |
| WO | 2010141737 A2 | 12/2010 |

OTHER PUBLICATIONS

U.S. Appl. No. 12/052,365, filed Mar. 20, 2008 entitled "Transparent Pressure Sensor and Method for Using".

Koehly, R., et al., Paper FSRs and Latex/Fabric Traction Sensors: Methods for the Development of Home-Made Touch Sensors, Proceedings of the 2006 International Conference on New Interfaces for Musical Expression (NIME06, Paris, France.

International Search Report and Written Opinion dated Dec. 8, 2010 in related case PCT/US2010/046718.

Final Office Action mailed on Apr. 11, 2013 in related U.S. Appl. No. 12/776,627, Steven Young, filed May 10, 2010.

(56) References Cited

OTHER PUBLICATIONS

Final Office Action mailed on Aug. 23, 2012 in U.S. Appl. No. 12/052,365, Hao Li, filed Mar. 20, 2008 (CML06745).
Final Office Action mailed on Jul. 14, 2011 in U.S. Appl. No. 12/052,365, Hao Li, filed Mar. 20, 2008 (CML06745).
International Preliminary Report on Patentability and Written Opinion for counterpart International Application No. PCT/US2010/046718 mailed on Mar. 8, 2012.
International Preliminary Report on Patentability and Written Opinion for related International Application No. PCT/US2011/032596 mailed on Nov. 22, 2012.
International Preliminary Report on Patentability and Written Opinion for related International Application PCT/US2010/060967 mailed on Sep. 27, 2012.
International Preliminary Report on Patentability and Written Opinion for related International Application PCT/US2011/044214 mailed on Feb. 14, 2013 (CM13575).
International Preliminary Report on Patentability and Written Opinion for related International Patent Application No. PCT/US2010/046717 issued on Mar. 8, 2012.
International Search Report and Written Opinion for related International Application No. PCT/US2011/044214 mailed on Dec. 1, 2011 (CM13575).
International Search Report and Written Opinion for related International Application No. PCT/US2010/046717 mailed on Nov. 30, 2010.
International Search Report and Written Opinion for related International Application No. PCT/US2010/060967 mailed on Jun. 15, 2012.
International Search Report and Written Opinion for related International Application No. PCT/US2011/032596 mailed on Sep. 30, 2011.
International Search Report for related International Application No. PCT/US2012/067079 mailed on Mar. 12, 2013.
Non Final Office Action mailed Apr. 8, 2013 in related U.S. Appl. No. 13/309,929, Yi Wei, filed Dec. 2, 2011 (CM14566).
Non Final Office Action mailed on Apr. 6, 2012 in U.S. Appl. No. 12/052,365, Hao Li, filed Mar. 20, 2008 (CML06745).
Non Final Office Action mailed on Feb. 14, 2013 in related U.S. Appl. No. 12/725,699, Hao Li, filed Mar. 17, 2010.
Non Final Office Action mailed on Feb. 24, 2011 in U.S. Appl. No. 12/052,365, Hao Li, filed Mar. 20, 2008 (CML06745).
Non Final Office Action mailed on May 20, 2013 in related U.S. Appl. No. 12/848,127, Hao Li, filed Jul. 31, 2010 (CM13575).
Non Final Office Action mailed on May 24, 2012 in related U.S. Appl. No. 12/549,008, Hao Li, filed Aug. 27, 2009.
Non Final Office Action mailed on Sep. 28, 2012 in related U.S. Appl. No. 12/776,627, Steven Young, filed May 10, 2010.
Notice of Allowance mailed on Nov. 29, 2012 in related U.S. Appl. No. 12/549,008, Hao Li, filed Aug. 27, 2009.
Notice of Allowance mailed on Sep. 7, 2012 in related U.S. Appl. No. 12/549,008, Hao Li, filed Aug. 27, 2009.
English translation of Korean Office Action for counterpart Application No. 10-2012-7004899 issued on Feb. 20, 2013.
Non Final Office Action mailed on Jul. 9, 2013 in related U.S. Appl. No. 12/052,365, Hao Li, filed Mar. 20, 2008 (CML06745).
Non Final Office Action mailed on Aug. 21, 2013 in related U.S. Appl. No. 12/725,699, Hao Li, filed Mar. 17, 2010.
Final Office Action mailed on Aug. 16, 2013 in related U.S. Appl. No. 13/309,929, Yi Wei, filed Dec. 2, 2011 (CM14566).
Final Office Action mailed Oct. 29, 2013 in related U.S. Appl. No. 12/052,365, Hao Li, filed Mar. 20, 2008 (CML06745).
Non-Final Office Action mailed Nov. 7, 2013 in related U.S. Appl. No. 12/848,127, Hao Li, filed Jul. 31, 2010 (CM13575).
Office Action dated Dec. 24, 2013 in related Korean patent application 10-2012-7029456.
English translation of Japanese Office Action for counterpart Application No. 2012-526954 issued on mailed on Jul. 26, 2013.
Non Final Office Action mailed on Jan. 2, 2014 in related U.S. Appl. No. 12/776,627, Steven Young, filed May 10, 2010.
Non Final Office Action mailed on Dec. 23, 2013 in related U.S. Appl. No. 13/309,929, Yi Wei, filed Dec. 2, 2011 (CM14566).
Final Office Action mailed Mar. 13, 2014 in related U.S. Appl. No. 12/848,127, Hao Li, filed Jul. 31, 2010 (CM13575).
European First Examiner Report mailed on Dec. 10, 2013 in counterpart European Patent application No. 10807684.5.
English translation of Korean Office Action for counterpart Application No. 10-2012-7023973 issued on Dec. 23, 2013.
English translation of Korean Office Action for counterpart Application No. 10-2012-7004856 issued on Jul. 21, 2013.
European Rejection Report mailed on Sep. 9, 2013 in counterpart European Patent application No. 10760477.9.
English translation of Japanese First Office Action for counterpart Application No. 2012-526953 mailed on Aug. 1, 2013.
International Search Report and Written Opinion for related International Application No. PCT/US2013/049967 mailed on Sep. 19, 2013 (CM14977).
Non Final Office Action mailed Apr. 18, 2014 in related U.S. Appl. No. 13/563,040, Yi Wei, filed Jul. 31, 2012 (CM14977).
Second Final Rejection dated May 19, 2014 in counterpart Korean patent application 10-2012-7004899.
Office Action dated Aug. 27, 2014 in counterpart China patent application 201080039352.8.

\* cited by examiner

SYSTEMS AND METHODS FOR PRESSURE-BASED AUTHENTICATION OF AN INPUT ON A TOUCH SCREEN

TECHNICAL FIELD

Embodiments of the subject matter described herein relate generally to touch sensing applications, and more particularly, embodiments of the subject matter relate to authorizing signatures impressed on a touch screen.

BACKGROUND

Many electronic devices use touch screens (or touch panels) to present information to a user and also receive input from the user. For example, a touch screen is capable of intuitively and naturally capturing a user's signature. Conventional touch sensing technologies sense the position of touches on a screen. While some touch sensing technologies are able to determine a magnitude of pressure (or force) applied to the touch screen, the pressure is determined based on the area of contact (or the rate of change thereof) on the surface of the touch screen. In this regard, the prior art approximates or extrapolates an estimate of the pressure applied, but does not measure the actual force applied. Furthermore, some capacitive touch screens are responsive to mere proximity to the surface of the touch screen, that is, they may respond or react when in fact no contact or impression has been made on the surface of the touch screen. As a result, prior art systems are not able to accurately measure and resolve the pressure (or force) that is applied against the touch screen to individual locations on the touch screen. Thus, conventional authentication methods for a signature impressed on a touch screen compare the two-dimensional spatial characteristics (e.g., size, shape, orientation, etc.) of the input signature to the spatial characteristics of a stored signature. However, a skilled forger can replicate the spatial characteristics of a user's signature, and thereby compromising the integrity of the authentication.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. Furthermore, there is no intention to be bound by any expressed or implied theory presented in the preceding technical field, background, brief summary or the following detailed description.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to touch sensing, touch screen calibration and/or configuration, touch screens, user identification and/or authentication, artificial neural networks, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically.

Technologies and concepts discussed herein relate to systems utilizing pressure-sensing (or force-sensing) touch screens, that is, a touch screen capable of measuring and/or resolving the pressure applied (or force) to one or more individual locations on the touch screen to the respective impression locations. The pressure-sensing touch screen is utilized to authenticate a manual (or handwritten) impression on the surface of a touch screen (or touch panel), such as a signature, that is intended to identify a particular user and proffered as that of the particular user. Although the subject matter is described herein in the context of a signature, the subject matter may be utilized to authenticate any manual impression(s) made on the surface of a touch screen (or touch panel) which is intended to identify a user, such as, for example, a name (cursive or printed), number, symbol, marking, gesture, or another impression intended to identify the user. As described in greater detail below, an input impression(s) on the touch screen (e.g., an input signature) is compared to a template corresponding to a particular user and authenticated as being made by that particular user based on two-dimensional spatial characteristics of the input impression(s), such as the size, shape, and/or orientation of the input signature, as well as the pressure (or force) applied by the user to the touch screen (or touch panel) at the individual impression locations that comprise the input. In an exemplary embodiment, the touch screen comprises a transparent touch panel that is responsive to pressure (or force) applied to the touch panel by any object, such as, for example, a stylus, pointer, pen, a finger and/or hand, a fingernail, or another suitable object.

Figure 1:
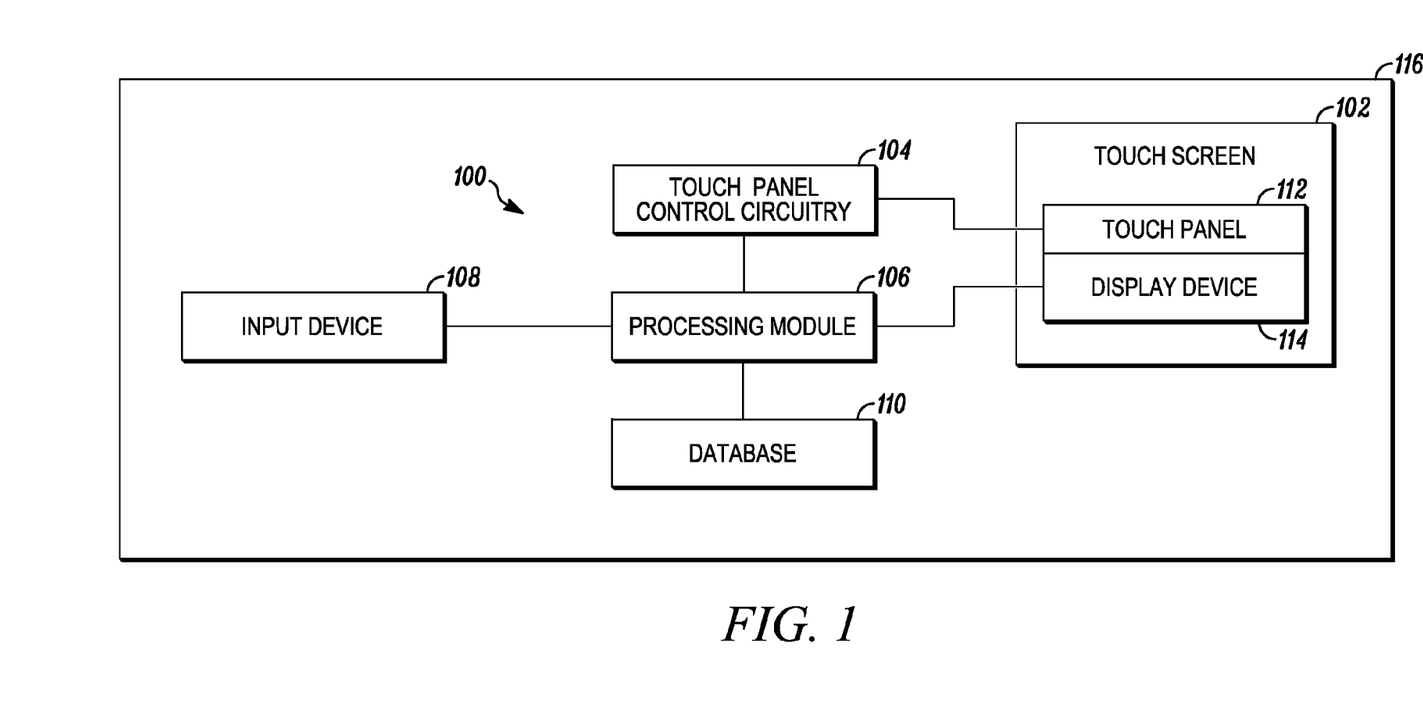
FIG. 1 is a block diagram of a signature authentication system in accordance with one embodiment.

FIG. 1 depicts a signature authentication system 100 suitable for use with an electronic device 116, such as, a computer, server, mobile device (e.g., cellular phone, personal digital assistant, and the like), automated teller machine, credit card reader, cash register, and the like. In an exemplary embodiment, the signature authentication system 100 includes, without limitation, a touch screen 102, touch panel control circuitry 104, a processing module 106, an input device 108, and a data storage element 110. It should be understood that FIG. 1 is a simplified representation of a signature authentication system 100 for purposes of explanation and is not intended to limit the scope of the subject matter in any way. In this regard, although FIG. 1 depicts the input device 108 as being part of the electronic device 116, in practice, the input device 108 may be separate from the electronic device 116 and communicatively coupled to the processing module 106 (e.g., via a wireless link). Similarly, in practice, the data storage element 110 may reside at a remote location (e.g., on a server) and be communicatively coupled to the processing module 106, for example, over a network (e.g., a local area network, a credit card or debit card transaction network).

In an exemplary embodiment, the touch screen 102 comprises a touch panel 112 and a display device 114. The touch panel 112 is coupled to the touch panel control circuitry 104, which, in turn, is coupled to the processing module 106. The processing module 106 is coupled to the display device 114 and is configured to control the rendering and/or display of one or more graphical objects on the display device 114 and correlates information received from the touch panel control circuitry 104 with the content displayed on the display device 114. The processing module 106 is also communicatively coupled to the input device 108 and the data storage element 110 to support operation of the signature authentication system 100, as described in greater detail below.

In an exemplary embodiment, the touch panel 112 is realized as a transparent touch panel that is responsive to pressure (or force) applied to one or more locations on the touch panel 112. In this regard, the touch panel 112 is pressure-sensitive (or force-sensitive) and may be utilized to determine the pressure (or force) applied to the touch panel 112 by the various impressions that comprise an input signature (or another input impression) on the touch screen 102 and resolve the pressure (or force) to the respective impression locations on the touch panel 112, as described in greater detail below. The touch panel 112 is preferably disposed proximate the display device 114 and aligned with respect to the display device 114 such that the touch panel 112 is interposed in the line-of-sight between a user and the display device 114 when the user views content displayed on the touch screen 102 and/or display device 114. In this regard, from the perspective of a user and/or viewer of the touch screen 102 and/or display device 114, at least a portion of the touch panel 108 overlaps and/or overlies content displayed on the display device 114. In accordance with one embodiment, the touch panel 108 is substantially planar in shape and disposed adjacent to a substantially planar surface of the display device 114, as described in greater detail below.

Figure 2:
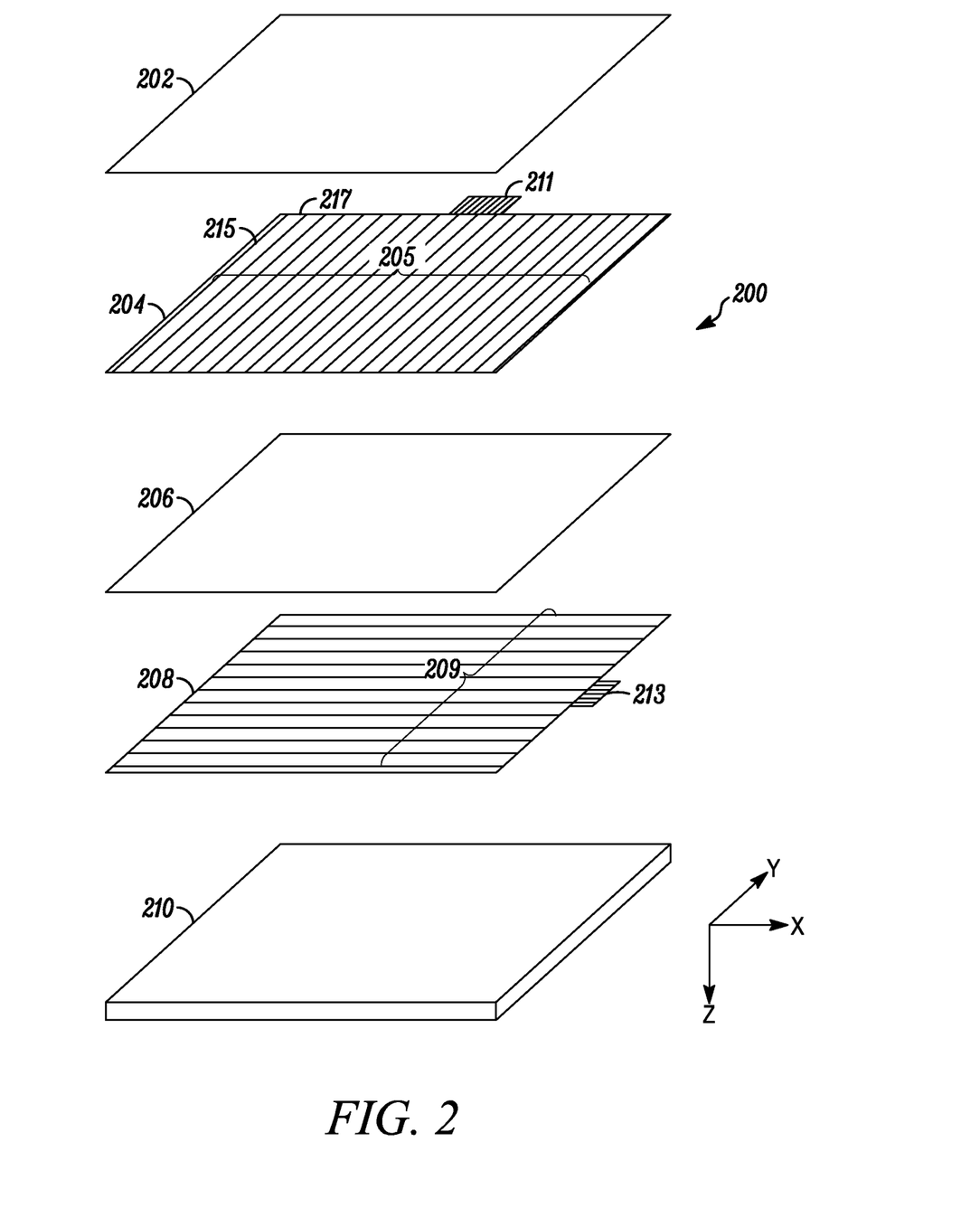
FIG. 2 is an exploded perspective view of a touch panel suitable for use in the signature authentication system of FIG. 1 in accordance with one embodiment.

FIG. 2 depicts an exploded view of a transparent touch panel 200 suitable for use as the touch panel 112 in the touch screen 102 of FIG. 1 in an exemplary embodiment. The touch panel 200 includes, without limitation, a transparent protective layer 202, a first transparent electrode layer 204, a transparent composite layer 206, a second transparent electrode layer 208, and a transparent substrate 210. The transparent protective layer 202 comprises a transparent protective material, such as glass or a polymer, which is disposed over the first transparent electrode layer 204. In an exemplary embodiment, the transparent substrate 210 is realized as a rigid material, such as, for example, glass or a polymer, however in alternative embodiments, the transparent substrate 210 may be realized as a flexible material. As described in greater detail below, in an exemplary embodiment, the transparent composite layer 206 is interposed between the transparent electrode layers 204, 208.

In an exemplary embodiment, each of the transparent electrode layers 204, 208 is realized as a patterned layer having a plurality of transparent conductive traces 205, 209, with each conductive trace being electrically coupled to a tab 211, 213 for providing an electrical connection to other circuitry. In this regard, in accordance with one embodiment, the tabs 211, 213 are coupled to the touch panel control circuitry 104 of FIG. 1. In an exemplary embodiment, the transparent conductive traces 205, 209 are realized as a transparent conductive oxide, such as, indium tin oxide, zinc oxide, or tin oxide. The second transparent electrode layer 208 is deposited on the transparent substrate 210 with the conductive traces 209 being aligned in a first direction. For example, as shown in FIG. 2, the conductive traces 209 are aligned with and/or parallel to the x-axis. The first transparent electrode layer 204 is deposited on the transparent composite layer 206 with its conductive traces 205 being aligned orthogonal to the conductive traces 209 of the second transparent electrode layer 208. For example, as shown in FIG. 2, the conductive traces 205 are aligned with and/or parallel to the y-axis.

By virtue of the orthogonal orientation of the conductive traces 205, 209, the transparent electrode layers 204, 208 produce a plurality of possible conducting paths from conductive traces 205 of the first transparent electrode layer 204 through the transparent composite layer 206 to conductive traces 209 of the second electrode layer 208 at each location where the conductive traces 205, 209 are overlapping and/or overlying along the z-axis. In this regard, the transparent electrode layers 204, 208 produce an m×n array (or matrix) of potential conducting paths through the transparent composite layer 206, where m is the number of rows of conductive traces 209 of the second electrode layer 208 and n is the number of columns of conductive traces 205 of transparent electrode layer 204. For example, in accordance with one embodiment, the second electrode layer 208 comprises 24 conductive traces 209 and the first transparent electrode layer 204 comprises 32 conductive traces 205 resulting in a 24×32 array of potential conducting paths.

In an exemplary embodiment, the transparent composite layer 206 is realized as a resilient material with transparent conductive (or semiconductive) particles uniformly dispersed within the material. For example, depending on the embodiment, the transparent composite layer 206 may comprise a transparent elastomeric matrix, such as, polyester, phenoxy resin, polyimide, or silicone rubber, with transparent conductive or semiconductive particles such as indium tin oxide, zinc oxide, or tin oxide dispersed within the material.

When pressure (or force) is applied to the surface of the touch panel 200 and/or transparent protective layer 202 (e.g., in the positive z-direction), the transparent composite layer 206 is compressed, thereby reducing the average distance between adjacent conductive particles dispersed within the transparent composite layer 206 underlying that particular location. In other words, the conductive paths formed by networks of adjacent particles increase in density (also known as percolation), thus increasing the conductance (or decreasing the resistance) of the transparent composite layer 206 between overlapping conductive traces of transparent electrode layer 204, 208 at the location(s) corresponding to the pressure applied to the touch panel 200 and/or transparent protective layer 202 (e.g., the impression location). Thus, a heavier force (or pressure) applied to the touch panel 200 and/or transparent protective layer 202 in the positive z-direction results in greater compression of the transparent composite layer 206, and thereby, a greater increase in conductivity (or decrease in resistance) of the transparent composite layer 206 at the particular impression location. In this manner, the transparent composite layer 206 acts as a variable resistance that is electrically in series with each conducting path between transparent electrode layers 204, 208, wherein the amount of resistance for a respective conducting path is directly related to the magnitude of the pressure (or force) applied to the touch panel 200 at the location corresponding to the respective conducting path (i.e., the location overlying the conducting path along the z-axis). As described in greater detail below, the resistance (or the change thereof) is measured or otherwise determined for each conducting path of the plurality of conducting paths, that is, each location of the m×n array, to determine the pressure (or force) applied to the surface of the touch panel 200 and/or transparent protective layer 202 at the locations on the touch panel 200 and/or transparent protective layer 202 corresponding to the respective conducting path (e.g., overlying along the z-axis). As described in greater detail below, based on the resistance (or the change thereof) for each conducting path, a pressure (or force) metric for each conducting path is obtained, wherein the pressure (or force) metric is indicative of the magnitude of the pressure (or force) applied to the touch panel 200 and/or transparent protective layer 202 overlying the respective conducting path.

Referring again to FIG. 1 with continued reference to FIG. 2, in an exemplary embodiment, the touch panel 112, 200 is integral with the display device 114 to provide a pressure-sensing (or force-sensing) touch screen 102. For example, if the display device 114 has a substantially planar viewing area, the touch panel 112, 200 and/or transparent substrate 210 may be aligned parallel to the planar viewing area of the display device 114. In an exemplary embodiment, the touch panel 112, 200 and display device 114 are separated by less than about 10 millimeters, however, in some embodiments, the touch panel 112, 200 may be directly adjacent to (or in contact with) the display device 114 (e.g., a negligible separation distance). The display device 114 is realized as an electronic display configured to graphically display information and/or content under control of the processing module 106. Depending on the embodiment, the display device 114 may be realized as a liquid crystal display (LCD), a cathode ray tube display (CRT), a light emitting diode (LED) display, an organic light emitting diode (OLED) display, a plasma display, or a projection display, or another suitable electronic display.

Referring again to FIG. 1, with continued reference to FIG. 2, the touch panel control circuitry 104 generally represents the hardware, software, and/or firmware components of the signature authentication system 100 which are configured to detect, measure or otherwise determine the resistance (or change thereof) for each conducting path of the plurality of conducting paths of the touch panel 112, 200, that is, each location where conductive traces 205, 209 of the touch panel 112, 200 overlap to create a conducting path through the transparent composite layer 206. In this regard, the touch panel control circuitry 104 is configured to scan each conducting path (e.g., each location of the m×n array), for example, by applying a reference voltage (or current) to a first conductive trace 215 of the first transparent electrode layer 204 and measuring the voltage (or current) at each conductive trace 209 of the second electrode layer 208 while maintaining the reference voltage applied to the first conductive trace 215. The measured voltage (or current) for each conductive trace 209 of the second electrode layer 208 depends on the resistance of the transparent composite layer 206 between first conductive trace 215 of the first transparent electrode layer 204 and the respective conductive trace 209 of the second electrode layer 208. In this manner, the touch panel 108, 200 is pressure-sensing (or force-sensing) because the measured voltage (or current) directly relates to the pressure (or force) applied to the touch panel 112, 200 overlying (e.g., along the z-axis) the overlap of the first conductive trace 215 of the first transparent electrode layer 204 and the respective conductive trace 209 of the second electrode layer 208. After measuring the voltage (or current) for each conductive trace 209 of the second electrode layer 208 in response to the applying the reference voltage to the first conductive trace 215, the touch panel control circuitry 104 applies the reference voltage to a second conductive trace 217 of the first transparent electrode layer 204, and while maintaining the reference voltage applied to the second conductive trace 217, measures the voltage (or current) of each conductive trace 209 of the second electrode layer 208, and so on until the voltage (or current) has been measured for each possible conducting path.

After measuring the voltage (or current) for each conducting path of the plurality of possible conducting paths, the touch panel control circuitry 104 converts the measured voltages (or currents) to corresponding pressure (or force) metrics which are indicative of the magnitude of the pressure (or force) applied to the touch panel 112, 200 by an impression overlying the respective conducting path. The touch panel control circuitry 104 generates a pressure map (or pressure matrix) which maintains the association and/or correlation between pressure metrics and their corresponding location on the touch panel 112, 200 (e.g., the location of the conducting path for the respective pressure metric). In this regard, the pressure map may comprise m×n array (or matrix) corresponding to the conducting paths of the touch panel 112, 200, wherein each entry of the m×n array is a pressure metric based on the resistance (or change thereof) at the particular location of the touch panel 112, 200. In this manner, the touch panel control circuitry 104 and touch panel 112, 200 are cooperatively configured to obtain pressure metrics that correspond to the pressure (or force) applied to the touch panel 112, 200 and/or touch screen 102 and resolve the pressure metrics to respective impression locations, that is, the location of the conducting path underlying (e.g., in the direction of the z-axis) the location where pressure (or force) is applied to the touch panel 112, 200. In an exemplary embodiment, the touch panel control circuitry 104 is configured to generate the pressure map at a rate of about 20 Hz to 200 Hz and provide the pressure map to the processing module 106, as described in greater detail below. Thus, each pressure map reflects the state of the pressure (or force) applied to the touch panel 112, 200 at a particular instant in time.

Figure 3:
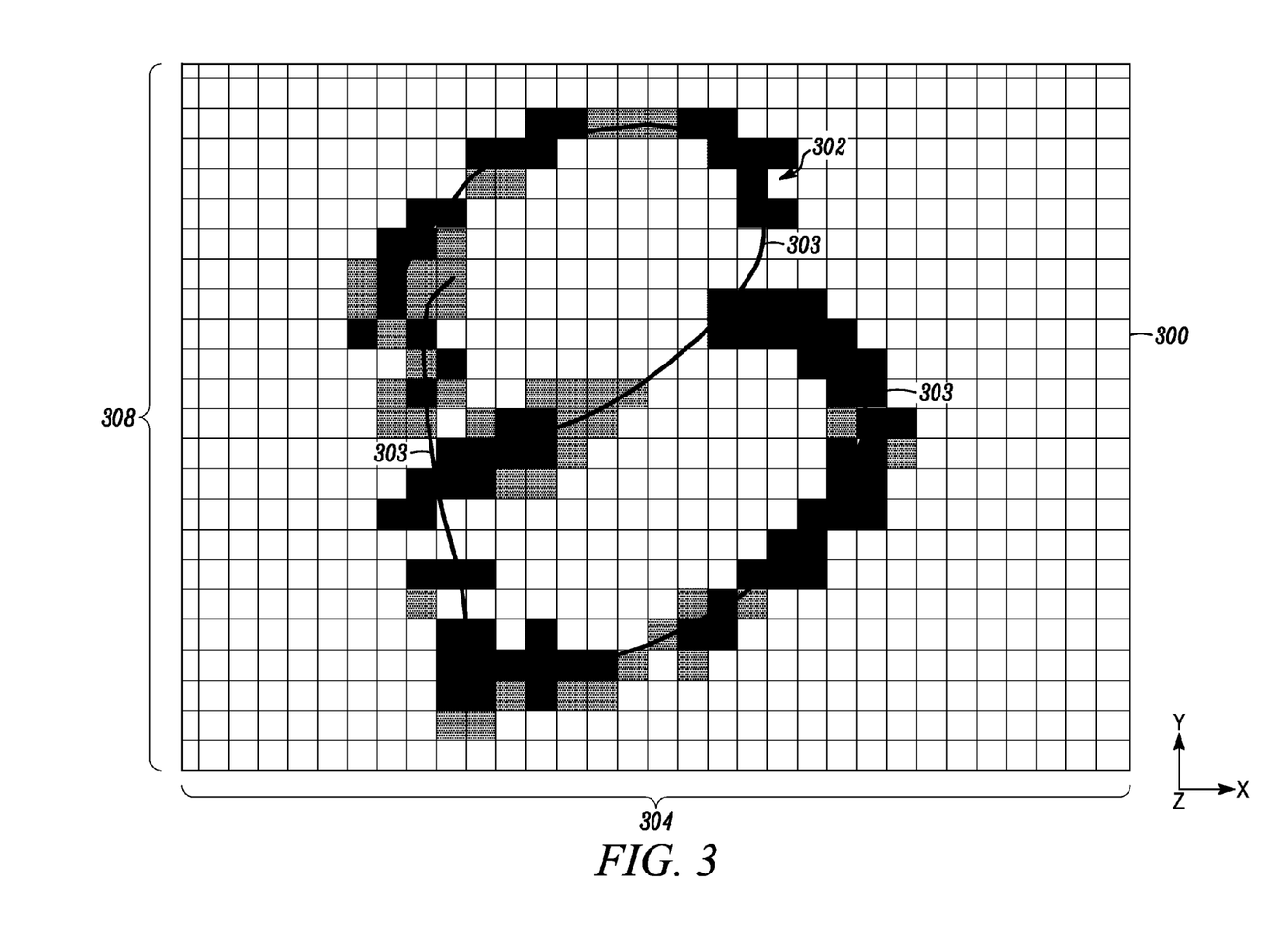
FIG. 3 depicts a pressure map corresponding to signature impressed on a touch screen suitable for use with the signature authentication system of FIG. 1 in accordance with one embodiment.

FIG. 3 depicts a static representation of a pressure map for an input signature 302 impressed upon a touch screen 300 that form a capital letter 'B'. It should be understood that in practice, the location(s) of the impression(s) comprising the signature 302 and the corresponding pressure metrics will vary over time and be captured by a plurality of individual pressure maps, which are correlated or otherwise combined into a time-varying signature pressure map, as described in greater detail below. Each pressure map corresponds to the state of the input impressions (e.g., input signature) on the touch screen 300, that is, the one or more impression locations and their corresponding pressure metrics, at a particular instant in time. For example, if the touch panel control circuitry 104 captures pressure maps at a rate of 60 Hz, each pressure map represents the state of the input signature on the touch screen 102, 300 and/or touch panel 112, 200 every sixtieth of a second.

As shown in FIG. 3, the pressure map is realized as an array comprising 24 rows of cells 308 and 32 columns of cells 304. In this regard, the touch screen 300 includes a transparent pressure-sensing touch panel, such as the touch panel 200 of FIG. 2, wherein the rows of cells 308 correspond to the rows of conductive traces of the touch panel that are aligned along the x-axis (e.g., conductive traces 209) and the columns of cells 304 correspond to columns of conductive traces of the touch panel aligned along the y-axis (e.g., conductive traces 205). In this regard, each cell corresponds to a conducting path where conductive traces are overlying along the z-axis, wherein the shading of each cell corresponds to the magnitude of the pressure (or force) applied to the touch screen 300 in the direction of the z-axis overlying the respective conducting path. As shown in FIG. 3, in practice, an impression on the touch screen 300 may overlap multiple conducting paths of the touch screen 300 resulting in multiple impression locations being detected by the touch screen 300 and/or signature authentication system 100. In response to detecting an input impression (e.g., input signature 302) on the touch screen 102, 300, the processing module 106 may display a graphical representation of the input impression 303 on the display device 114 that corresponds to and tracks the impression(s) on the touch screen 102, 300. As shown in FIG. 3, the processing module 106 may display the graphical representation of the signature 303 by interpolating the two-dimensional (x, y) location information for the impression locations of the input signature 302 to provide a finer resolution for the graphical representation of the signature 303.

Referring again to FIG. 1, with continued reference to FIGS. 2 and 3, in an exemplary embodiment, the input device 108 is communicatively coupled to the processing module 106 and adapted to allow a user to identify himself or herself (e.g., by entering a username or an identification number) or otherwise obtain a user identifier to be associated with an input signature (or another input impression) on the touch screen 102, as described in greater detail below. In various embodiments, the input device 108 may be realized as a keypad, keyboard, card reader (e.g., a credit card reader, debit card reader, access card reader, smart card reader, and the like), barcode reader, radio-frequency identification (RFID) reader, magnetic stripe reader, mouse, joystick, knob, microphone, or another suitable device. In an exemplary embodiment, the data storage element 110 is realized as a database configured to maintain an association between a user identifier and a signature template corresponding to the user identifier, as described in greater detail below.

The processing module 106 generally represents the hardware, software, and/or firmware components configured to facilitate the authentication of an input signature on the touch screen 102 and/or touch panel 112 and perform additional tasks and/or functions described in greater detail below. Depending on the embodiment, the processing module 106 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. The processing module 106 may also be implemented as a combination of computing devices, e.g., a combination of a digital signal processor and a microprocessor, a plurality of microprocessors, one or more microprocessors in conjunction with a digital signal processor core, or any other such configuration. In practice, the processing module 106 includes processing logic that may be configured to carry out the functions, techniques, and processing tasks associated with the operation of the signature authentication system 100, as described in greater detail below. Furthermore, the steps of a method or algorithm described in connection with the embodiments disclosed herein may be embodied directly in hardware, in firmware, in a software module executed by the processing module 106, or in any practical combination thereof.

Figure 4:
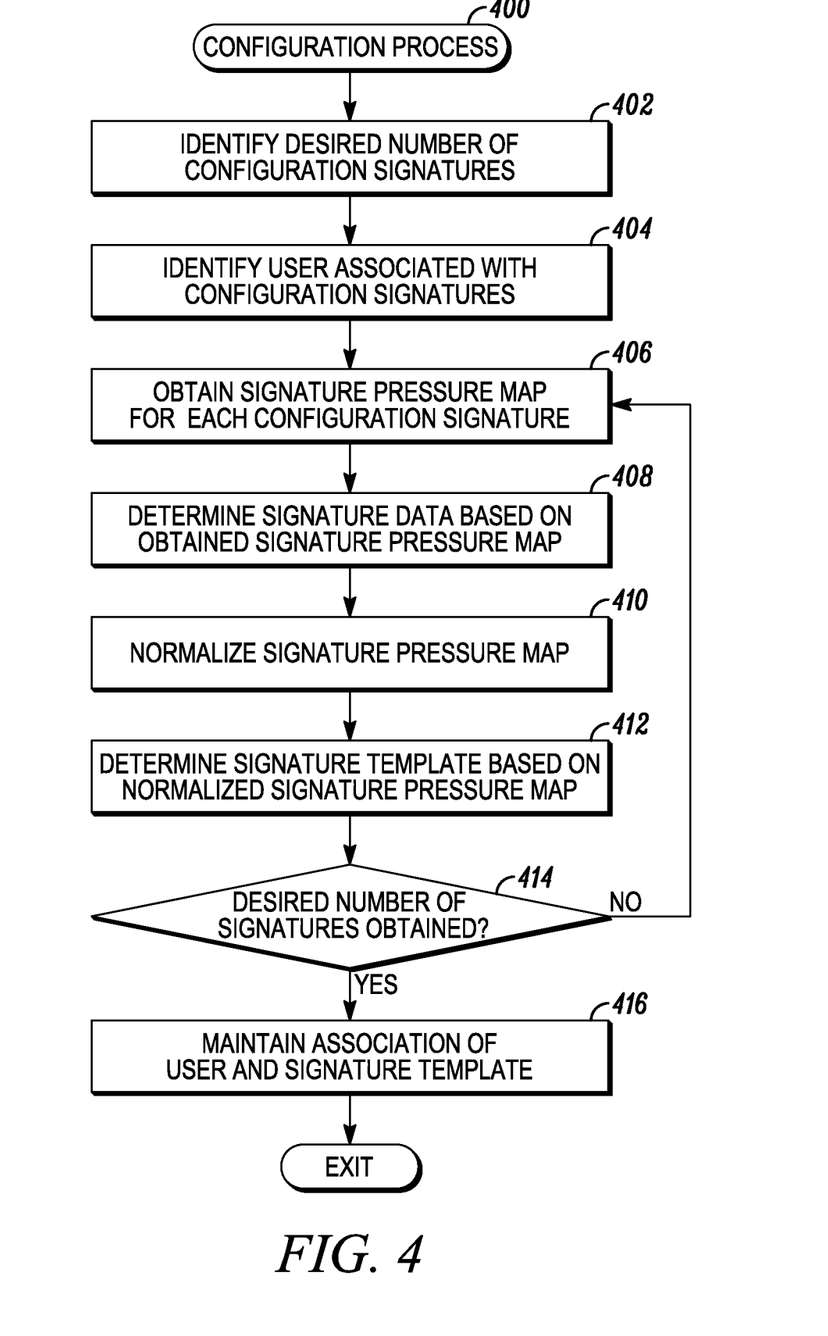
FIG. 4 is a flow diagram of a configuration process suitable for use with the signature authentication system of FIG. 1 in accordance with one embodiment.

Referring now to FIG. 4, in an exemplary embodiment, a signature authentication system may be configured to perform a configuration process 400 and additional tasks, functions, and/or operations as described below. The various tasks may be performed by software, hardware, firmware, or any combination thereof. For illustrative purposes, the following description may refer to elements mentioned above in connection with FIG. 1 and FIG. 2. In practice, the tasks, functions, and operations may be performed by different elements of the described system, such as the touch screen 102, touch panel 112, 200, touch panel control circuitry 104, processing module 106, input device 108 and/or data storage element 110. It should be appreciated any number of additional or alternative tasks may be included, and may be incorporated into a more comprehensive procedure or process having additional functionality not described in detail herein.

Referring now to FIG. 4, and with continued reference to FIGS. 1-3, a configuration process 400 may be performed to create a signature template (or signature model) from one or more configuration signatures which will be used as a key to verify and/or authenticate an input signature on a touch screen that is subsequently proffered as that of a particular user. Depending on the embodiment, the input signature may comprises a name (cursive or printed), number, symbol, marking, gesture, or another impression on the touch screen made by a user which is intended to identify the user. In an exemplary embodiment, the configuration process 400 begins by identifying a desired number of configuration signatures to be used to create the signature template (task 402). In this regard, using multiple signatures to create the signature template compensates for biometrically insignificant variations in an individual's signature over time and provides a robust model for the user's signature. The configuration process 400 may be configured for a default number of configuration signatures, or alternatively, the configuration process 400 may identify the desired number of configuration signatures in response to a user input (e.g., via input device 108 and/or touch screen 102).

In an exemplary embodiment, the configuration process 400 continues by obtaining a user identifier to be associated with the signature template and thereby identifying the user associated with the configuration signature(s) (task 404). The user identifier is preferably a unique identifier used to associate the signature template with a unique user, as described in greater detail below. The user identifier may comprise a name, identification number, account number, government issued number, or some other identifying information that is unique to a particular user. The user identifier may be obtained via the input device 108, for example, by a user swiping a card containing identification information (e.g., an access card, credit card, debit card, or the like) or by a user manually entering his or her identification information via the input device 108 and/or touch screen 102.

In accordance with one embodiment, in response to obtaining the user identifier, the processing module 106 renders and/or displays a signature capture area on the display device 114, such as, for example, a signature box or a signature line. The configuration process 400 continues by obtaining, capturing, or otherwise determining pressure metrics for the one or more impressions comprising the configuration signature for the identified user and generating a signature pressure map of the configuration signature (tasks 406). As used herein, the signature pressure map (S(t)) comprises to a three-dimensional time-varying representation of the signature that represents the two-dimensional positional information for the impression locations on the touch screen 102 and/or touch panel 112, 200 along with the pressure metrics corresponding to the pressure (or force) applied at the respective impression locations with respect to time (e.g., S(t)=[x(t), y(t), p(t)]). In an exemplary embodiment, the touch panel control circuitry 104 obtains and/or generates one or more pressure maps in response to an impression on the touch panel 112, 200, wherein each pressure map comprises pressure metrics for the conducting paths of the touch panel 112, 200 in response to the configuration signature at a particular instant in time. In this regard, the each pressure map reflects the state of the input impression(s) on the touch screen 102 and/or touch panel 112,200 as the configuration signature progresses from an initial location to completion.

In an exemplary embodiment, the touch panel control circuitry 104 provides the one or more pressure maps to the processing module 106 which determines the signature pressure map (e.g., the three-dimensional time-varying representation of the configuration signature) by correlating or otherwise combining the one or more pressure maps to obtain the time-varying signature pressure map for the configuration signature. In an exemplary embodiment, the processing module 106 generates the signature pressure map by first converting the pressure metrics to varying intensity values or grayscale, for example, by dividing each pressure metric by the maximum pressure metric for the configuration signature. After converting the pressure metrics to grayscale, the processing module 106 interpolates the pressure maps generated by the touch panel control circuitry 104 to obtain the signature pressure map (S(t)). By applying an interpolation method, such as Bézier curve fitting or spline interpolation, to the discrete-time (or sampled) pressure maps generated by the touch panel control circuitry 104, the signature pressure map more accurately reflects the impression(s) made by the user on the touch screen 102 and/or touch panel 112, 200 when inputting the configuration signature.

After generating the signature pressure map, in an exemplary embodiment, the configuration process 400 continues by determining verification data for the captured signature based on the obtained signature pressure map (task 408). In this regard, the processing module 106 calculates, computes, or otherwise determines data which may be used to verify the authenticity of a subsequent input signature associated with the user identifier and/or user. For example, the processing module 106 may calculate or determine the velocity of the signature in the horizontal and/or vertical direction (e.g., x'(t), y'(t)), the acceleration of the signature in the horizontal and/or vertical direction (e.g., x"(t), y"(t)), the jerk of the signature in the horizontal and/or vertical direction (e.g., x'''(t), y'''(t)), as well as various derivatives of the pressure (p(t)).

In an exemplary embodiment, the configuration process 400 continues by normalizing the signature pressure map (task 410). In this regard, the configuration process 400 rotates, scales, and/or transforms the signature pressure map to eliminate signature variations, such as the alignment of the signature, that do not contain or otherwise represent significant and/or valuable biometric information for purposes of user authentication. For example, if the processing module 106 displays a signature capture area on the display device 114, the processing module 106 may rotate, scale, and/or transform the signature pressure map such that the signature pressure map is centered with respect to the signature capture area. If the processing module 106 displays a signature line or signature box on the display device 114, the processing module 106 may rotate and/or transform the signature pressure map such that the signature pressure map is substantially aligned with the signature line or signature box.

After normalizing the signature pressure map, in an exemplary embodiment, the configuration process 400 continues by determining or otherwise generating a signature template based on the normalized signature pressure map for the configuration signature (task 412). In an exemplary embodiment, the signature template comprises a model of the identified user's signature obtained by applying a machine learning model (or machine learning algorithm), an artificial neural network, or another suitable modeling technique to the normalized signature pressure map for the configuration signature, such as, for example, a hidden Markov model, a k-nearest neighbor algorithm, a multilayer perceptron or another suitable feedforward neural network, a radial basis function network, a support vector machine, or the like. In this manner, the signature template (or signature model) captures the two-dimensional characteristics (e.g., [x(t), y(t)]) of the configuration signature(s) (e.g., the user's handwriting) and along with the pressure applied by the user at the various impression locations that comprise the configuration signature (e.g., p(t)). In an exemplary embodiment, the signature template (or signature model) also reflects the verification data and/or other biometric information such as the velocity of the signature in the horizontal and/or vertical direction, the acceleration of the signature in the horizontal and/or vertical direction, and the jerk of the signature in the horizontal and/or vertical direction.

In an exemplary embodiment, the configuration process 400 continues by determining whether the desired number of configuration signatures have been obtained (task 414). If the desired number of configuration signatures have not been obtained, the loop defined by tasks 406, 408, 410, 412 and 414 repeats until the desired number of configuration signatures have been obtained. For example, the processing module 106 may reset the display device 114 and/or touch screen 102 or otherwise indicate to the user to input another configuration signature on the touch screen 102 and/or touch panel 112. For each configuration signature, the configuration process 400 obtains a normalized signature pressure map in a similar manner as describe above (tasks 406, 408, 410), however, for each subsequently obtained signature pressure map, the configuration process 400 updates the signature template (or signature model) by applying the particular machine learning model (or machine learning algorithm), artificial neural network, or modeling technique to each subsequently obtained normalized signature pressure map, thereby training the signature model for the identified user, such that the signature template (or signature model) reflects the most recently received configuration signature (task 412). Once the desired number of configuration signatures has been obtained, the configuration process 400 continues by maintaining the association of the user identifier and the signature template (task 416). In an exemplary embodiment, the processing module 106 stores the signature template (or signature model) to the database 110 which maintains the association between the user identifier and the signature template for subsequent authentication.

Figure 5:
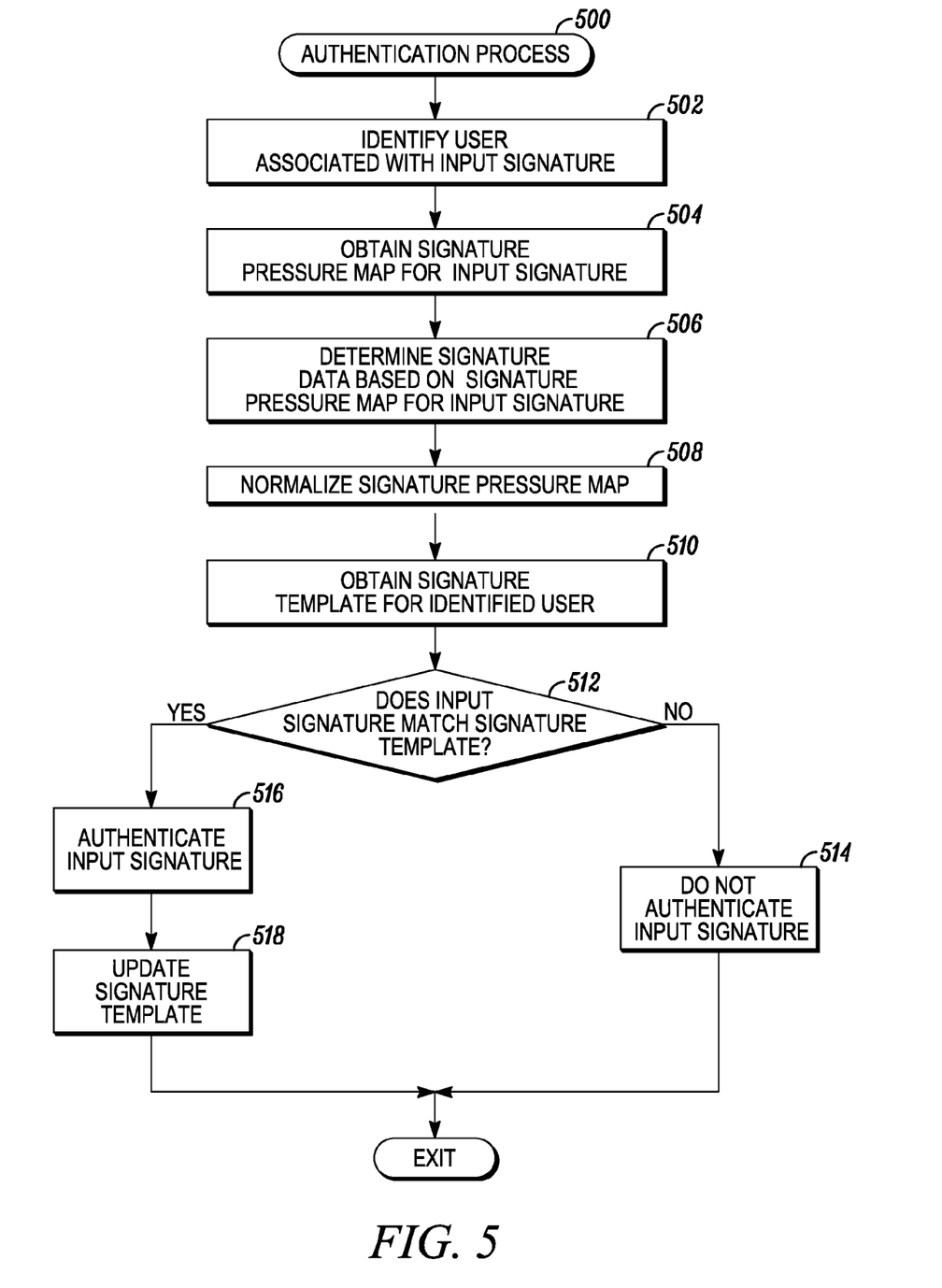
FIG. 5 is a flow diagram of an authentication process suitable for use with the signature authentication system of FIG. 1 in accordance with one embodiment.

Referring now to FIG. 5, in an exemplary embodiment, a signature authentication system may be configured to perform an authentication process 500 and additional tasks, functions, and/or operations as described below. The various tasks may be performed by software, hardware, firmware, or any combination thereof. For illustrative purposes, the following description may refer to elements mentioned above in connection with FIG. 1 and FIG. 2. In practice, the tasks, functions, and operations may be performed by different elements of the described system, such as the touch screen 102, touch panel 112, 200, touch panel control circuitry 104, processing module 106, input device 108 and/or data storage element 110. It should be appreciated any number of additional or alternative tasks may be included, and may be incorporated into a more comprehensive procedure or process having additional functionality not described in detail herein.

Referring now to FIG. 5, and with continued reference to FIGS. 1-4, an authentication process 500 may be performed to authenticate or otherwise verify that an input signature (or another input impression) on a touch screen and/or touch panel proffered on behalf of a known user was actually input by that known user, for example, to subsequently allow the user to access to a device or service. In an exemplary embodiment, the authentication process 500 begins by identifying the user to be authenticated by obtaining the user identifier associated with the particular user (task 502). For example, the processing module 106 may identify the user via the input device 108 and/or touch screen 102 in a similar manner as set forth above in the context of FIG. 4 (e.g., task 404). The authentication process 500 continues by obtaining, capturing, or otherwise determining, using the touch screen, pressure metrics for the impression(s) of the input signature proffered on behalf of the identified user and generating a signature pressure map of the input signature (task 504). In this regard, the touch panel control circuitry 104 captures and/or generates one or more pressure maps in response to the input signature on the touch panel 112, 200, and provides the one or more pressure maps to the processing module 106 which correlates or otherwise combines the pressure maps to generate a signature pressure map of the input signature, in a similar manner as described above in the context of FIG. 4 (e.g., task 406). After obtaining the signature pressure map for the input signature, in an exemplary embodiment, the authentication process 500 continues by determining verification data for the input signature based on the obtained input signature pressure map and normalizing the input signature pressure map (tasks 506, 508), in a similar manner as set forth above in the context of FIG. 4 (e.g., tasks 408, 410).

In an exemplary embodiment, the authentication process 500 obtains the signature template associated with or otherwise corresponding to the identified user (task 510). In this regard, the processing module 106 obtains the signature template from the database 110 associated with the identified user identifier (e.g., task 502). After obtaining the appropriate signature template, the authentication process 500 continues by comparing the normalized signature pressure map for the input signature to the signature template (or signature model) and determining whether the normalized input signature pressure map matches the signature template (task 512). In this regard, the processing module 106 applies one or more similarity measures, such as dynamic time warping, to the determine whether the normalized input signature pressure map matches the signature template (or signature model) or otherwise determines the probability that the normalized input signature pressure map follows or is otherwise in accordance with the learned signature model for the identified user. If the input signature does not match the signature template for the identified user, for example, if the probability of the input signature following the signature template (or signature model) is less than fifty percent, the authentication process 500 does not authenticate the input signature, thereby preventing the user from access to a particular device (e.g., electronic device 116 or another device associated with and/or controlled by electronic device 116), service, or location associated with the signature authentication system (task 514).

In response to determining the input signature matches the signature template, for example, if the probability of the input signature following the signature template (or signature model) is greater than fifty percent, the authentication process 500 determines the input signature was input or otherwise made by the identified user (task 516). In this regard, the signature authentication system 100 and/or electronic device 116 authenticates the user, and thereby, may allow the user to access a particular device, service, or location associated with the signature authentication system 100. For example, the processing module 106 may allow the user to access and/or control the electronic device 116 or provide the user with access to a desired service (e.g., a credit card network, debit card network, or the like) via the electronic device 116. Alternatively, the signature authentication system 100 may be configured to allow the user access to another device or a particular location (e.g., a laboratory, office building, government building, or the like) that the signature authentication system 100 and/or electronic device 116 controls access to. In an exemplary embodiment, when the input signature matches the signature template (or signature model), the authentication process 500 updates the signature template (or signature model) to reflect the authenticated input signature (task 518), in a similar manner as set forth above in the context of FIG. 4 (e.g., task 412). By dynamically updating the signature template with authenticated and/or verified signatures, the template (or model) accounts for variations in a user's signature over time.

To briefly summarize, one advantage of the systems and/or methods described above is that additional biometric information pertaining to the pressure applied by a user throughout entering his or her signature on a touch screen and/or touch panel is utilized to authenticate a signature proffered on behalf of the user. A transparent pressure-sensing touch panel is utilized to obtain pressure metrics based on a change in resistance and/or conductivity which is directly related to pressure applied to the touch panel, such that the transparent pressure-sensing touch panel is used to effectively measure the pressure applied to the touch screen and/or touch panel by an input signature. The transparent pressure-sensing touch panel resolves the applied pressure to individual pressure metrics associated with individual impressions of the input signature, such that the pressure applied by each impression may be utilized in authenticating and/or verifying the input signature. This improves the integrity of the authentication process and increases the difficulty of forging a user's signature.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for authenticating an input by a user on a force-sensing touch screen, the input being proffered as that of a first user, the method comprising:
    storing a signature template for the first user, the signature template including a first plurality of impressions, each of the first plurality of impressions corresponding to a magnitude of force used by the first user to generate the signature template;
    inputting, by the first user, a user identifier using an input device;
    associating the user identifier with the signature template;
    obtaining an input signature from the user comprising a plurality of impressions applied to the force-sensing touch screen, wherein each impression corresponds to a magnitude of force applied by the user to the force-sensing touch screen at a respective impression location of the input signature; and
    authenticating the user as the first user based at least in part on comparing the magnitude of force of at least one impression of the input signature applied by the user to the force-sensing touch screen with the magnitude of force of a corresponding impression of the signature template generated by the first user.

2. The method of claim 1, further comprising:
    obtaining one or more pressure metrics for a configuration signature by the first user on the touch screen, wherein each pressure metric corresponds to a pressure applied by the first user to the touch screen at a respective impression location of the configuration signature; and
    generating the signature template for the first user based at least in part on the one or more pressure metrics for the configuration signature.

3. The method of claim 1, wherein obtaining the input signature from the user comprises obtaining a signature pressure map for the input signature.

4. A signature authentication system comprising:
    a force-sensing touch screen configured to obtain an input signature from a user comprising a plurality of impressions applied to the force-sensing touch screen, wherein each impression corresponds to a magnitude of force applied by the user to the force-sensing touch screen at a respective impression location of the input signature;
    a data storage element configured to store a signature template for a first user, the signature template including a first plurality of impressions, each of the first plurality of impressions corresponding to a magnitude of force used by the first user to generate the signature template;
    an input device configured to obtain a user identifier for the user; and
    a processing module coupled to the force-sensing touch screen and the data storage element, wherein the processing module is configured to associate the user identifier with the signature template and to authenticate the user as the first user based at least in part on comparing the magnitude of force of at least one impression of the input signature applied by the user to the force-sensing touch screen with the magnitude of force of a corresponding impression of the signature template generated by the first user.

5. The signature authentication system of claim 4, further comprising an input device coupled to the processing module, wherein the input device and the processing module are cooperatively configured to obtain an identifier for the user, wherein:
    the data storage element maintains an association between the signature template and the identifier; and
    the processing module is configured to obtain the signature template associated with the identifier from the data storage element.

6. The signature authentication system of claim 4, wherein the touch screen comprises a transparent touch panel.

7. The signature authentication system of claim 6, wherein the transparent touch panel comprises a resilient material having transparent conductive particles dispersed within the resilient material.

8. The signature authentication system of claim 6, the input signature comprising one or more impression locations on the transparent touch panel, wherein:
    the transparent touch panel comprises a transparent composite layer; and
    each of the plurality of impressions applied to the force-sensing touch screen corresponds to a resistance of the transparent composite layer at a respective impression location of the one or more impression locations.

9. The signature authentication system of claim 6, further comprising touch panel control circuitry coupled to the transparent touch panel and the processing module, wherein the touch panel control circuitry is configured to:
    obtain one or more pressure maps, each pressure map comprising a plurality of impressions applied to the force-sensing touch screen for the input signature at a particular instant in time, wherein each of the plurality of impressions corresponds to a magnitude of force applied to the transparent touch panel at a respective impression location of the input signature; and
    provide the one or more pressure maps to the processing module.

10. The signature authentication system of claim 9, wherein the processing module is configured to generate a signature pressure map for the input signature based on the one or more pressure maps provided by the touch panel control circuitry.

11. The signature authentication system of claim 6, the input signature comprising one or more impression locations on the transparent touch panel, wherein:
    the transparent touch panel comprises:
        a transparent composite layer;
        a first transparent electrode layer disposed on the transparent composite layer; and
        a second transparent electrode layer, wherein the transparent composite layer is disposed on the second transparent electrode layer; and
    each of the plurality of impressions applied to the force-sensing touch screen corresponds to a resistance of the transparent composite layer between the first transparent electrode layer and the second transparent electrode layer at a respective impression location of the one or more impression locations.

* * * * *